US012298266B2

(12) United States Patent
Nour et al.

(10) Patent No.: US 12,298,266 B2
(45) Date of Patent: May 13, 2025

(54) CHANGES IN RESISTIVITY OF MESH-PATTERNED POLYMER THIN FILMS COATED WITH CONDUCTIVE TRACES USED TO DETECT HYDROCARBON FUELS HIDDEN IN PARAFFIN-BASED LUBRICATION OILS

(71) Applicants: Saudi Arabian Oil Company, Dhahran (SA); King Abdullah University of Science and Technology, Thuwal (SA)

(72) Inventors: Maha Nour, Thuwal (SA); Ayman Amer, Thuwal (SA); Abdullah Hassan Bukhamsin, Thuwal (SA); Esraa Fakeih, Thuwal (SA); Sumana Bhattacharjee, Thuwal (SA); Khaled Nabil Salama, Thuwal (SA)

(73) Assignees: Saudi Arabian Oil Company, Dhahran (SA); King Abdullah University of Science and Technology, Thuwal (SA)

( * ) Notice: Subject to any disclaimer, the term of this patent is extended or adjusted under 35 U.S.C. 154(b) by 238 days.

(21) Appl. No.: 18/128,909

(22) Filed: Mar. 30, 2023

(65) Prior Publication Data

US 2024/0328980 A1     Oct. 3, 2024

(51) Int. Cl.
*G01N 27/12*     (2006.01)

(52) U.S. Cl.
CPC ......... *G01N 27/126* (2013.01); *G01N 27/122* (2013.01); *G01N 27/128* (2013.01)

(58) Field of Classification Search
CPC ........ G01N 27/00; G01N 27/02; G01N 27/04; G01N 27/12; G01N 27/122; G01N 27/125; G01N 27/126; G01N 27/128
(Continued)

(56) References Cited

U.S. PATENT DOCUMENTS 3,156,644 A    11/1964   Kunin
4,031,398 A    6/1977   Callis et al.
(Continued)

FOREIGN PATENT DOCUMENTS

CN    101652641 A   *   2/2010     .......... A61M 1/0001
CN    105164764 B   *   9/2018     ............ G06F 3/041
(Continued)

OTHER PUBLICATIONS

Aboaba et al., "Brain Tumor Quantification Equation: Modeled on Complete Step Response Algorithm," International Conference on Computer and Communication Engineering (ICCCE 2012), Jul. 3-5, 2012, 988-991, 4 pages.
(Continued)

*Primary Examiner* — Hoai-An D. Nguyen

(74) *Attorney, Agent, or Firm* — Fish & Richardson P.C.

(57) ABSTRACT

Systems and methods include a computer-implemented method for determining a concentration of hydrocarbon fuel in a fluid sample. A thin Cyclic Olefin Copolymer (COC) film of a COC layer having a honeycomb mesh-pattern forming a conductive metal trace is sputtered. The thin COC film is configured to dissolve upon contact with alkyl aromatic compounds present in hydrocarbon fuels. A fluid sample of a hydrocarbon fuel is positioned in an open area on the thin COC film. A resistivity of the conductive metal trace is monitored. A determination is made in response to the monitoring that a change in resistivity of the conductive metal trace has occurred resulting from dissolution of the thin COC film. A time duration is measured from the
(Continued)

positioning of the fluid sample to the resistivity change. A concentration of the hydrocarbon fuel in the fluid sample is determined based on the time duration.

20 Claims, 3 Drawing Sheets

(58) Field of Classification Search
USPC .................................. 324/600, 649, 691, 693
See application file for complete search history.

(56) References Cited

U.S. PATENT DOCUMENTS

| | | |
|---|---|---|
| 4,307,061 A | 12/1981 | Sarholz |
| 4,651,010 A | 3/1987 | Javan |
| 5,422,719 A | 6/1995 | Goldstein |
| 5,818,582 A | 10/1998 | Fernandez et al. |
| 5,899,567 A | 5/1999 | Morris, Jr. |
| 5,982,847 A | 11/1999 | Nelson |
| 6,023,961 A | 2/2000 | Discenzo |
| 6,507,401 B1 | 1/2003 | Turner |
| 6,525,325 B1 | 2/2003 | Andrews et al. |
| 6,692,720 B1 | 2/2004 | Ninane et al. |
| 6,707,556 B2 | 3/2004 | Turner |
| 6,911,830 B2 | 6/2005 | Heremans et al. |
| 7,442,291 B1 | 10/2008 | Discenzo |
| 7,839,492 B2 | 11/2010 | Parks, II et al. |
| 8,017,408 B2 | 9/2011 | Meinhart et al. |
| 8,390,796 B2 | 3/2013 | Honda |
| 8,408,073 B2 | 4/2013 | Sparks et al. |
| 8,704,174 B2 | 4/2014 | Ukon |
| 8,910,514 B2 | 12/2014 | Sullivan et al. |
| 9,206,386 B2 | 12/2015 | Tunheim et al. |
| 9,255,875 B2 | 2/2016 | Denenberg et al. |
| 9,518,918 B2 | 12/2016 | Mann et al. |
| 9,822,356 B2 | 11/2017 | Ismagilov et al. |
| 10,060,899 B2 | 8/2018 | Hegazi et al. |
| 10,100,966 B2 | 10/2018 | Vermont et al. |
| 10,317,388 B2 | 6/2019 | Hegazi et al. |
| 10,502,409 B2 | 12/2019 | Meinhart et al. |
| 10,643,324 B2 | 5/2020 | Al Shehri et al. |
| 10,768,094 B2 | 9/2020 | Amer et al. |
| 10,908,069 B2 | 2/2021 | Amer et al. |
| 2002/0158211 A1 | 10/2002 | Gillispie |
| 2003/0133105 A1 | 7/2003 | Gorelik et al. |
| 2003/0141459 A1 | 7/2003 | Hegazi et al. |
| 2004/0007675 A1 | 1/2004 | Gillispie et al. |
| 2004/0124366 A1 | 7/2004 | Zeng et al. |
| 2006/0114007 A1 | 6/2006 | Cho |
| 2007/0009423 A1 | 1/2007 | Handy et al. |
| 2007/0063140 A1 | 3/2007 | Liu |
| 2007/0095395 A1 | 5/2007 | Spiess |
| 2007/0187617 A1 | 8/2007 | Kong |
| 2009/0006004 A1 | 1/2009 | Sens et al. |
| 2009/0216419 A1 | 8/2009 | Shaw |
| 2010/0269579 A1 | 10/2010 | Lawrence et al. |
| 2011/0155925 A1 | 6/2011 | Ukon |
| 2011/0166802 A1 | 7/2011 | Kong |
| 2011/0236569 A1 | 9/2011 | Weiller |
| 2011/0267603 A1 | 11/2011 | Shaw |
| 2011/0303834 A1 | 12/2011 | Hegazi et al. |
| 2012/0086942 A1 | 4/2012 | Honda |
| 2013/0333893 A1 | 12/2013 | Morris |
| 2014/0198313 A1 | 7/2014 | Tracy et al. |
| 2015/0009495 A1 | 1/2015 | Li et al. |
| 2015/0085290 A1 | 3/2015 | Fjerdingstad |
| 2015/0168368 A1 | 6/2015 | Hegazi et al. |
| 2016/0195509 A1 | 7/2016 | Jamieson |
| 2016/0202194 A1 | 7/2016 | Lees |
| 2016/0349198 A1 | 12/2016 | Barney |
| 2021/0255039 A1 | 8/2021 | Morgan, III |
| 2021/0389264 A1 | 12/2021 | Ito et al. |
| 2023/0314402 A1 | 10/2023 | Nour et al. |

FOREIGN PATENT DOCUMENTS

| | | | | |
|---|---|---|---|---|
| CN | 108699463 A | * | 10/2018 | .............. B01F 17/00 |
| CN | 107044892 B | * | 1/2020 | ........... A47C 20/041 |
| DE | 10245947 B4 | * | 1/2007 | ......... G01N 33/0013 |
| FR | 2817346 | | 5/2002 | |
| WO | WO 2020047469 | | 3/2020 | |

OTHER PUBLICATIONS

Agha et al., "A Review of Cyclic Olefin Copolymer Applications in Microfluidics and Microdevices," Macromolecular Materials and Engineering, 2022, 307(2200053):1-34, 35 pages.

Al-Abdullah et al., "Flash points and volatility characteristics of gasoline/diesel blends," Fuel, Aug. 2015, 153:67-69, 3 pages.

Al-Samhan et al., "Evaluating scale deposition and scale tendency of effluent water mix with seawater for compatible injection water," Journal of Petroleum Exploration and Production Technology, Mar. 10, 2020, 10(5):2105-2111, 7 pages.

Álvarez et al., "Prediction of Flash-Point Temperature of Alcohol/Biodiesel/Diesel Fuel Blends," Ind. Eng. Chem. Res., Apr. 2019, 58(16):6860-6869, 10 pages.

Beck et al., "Development and characterization of a mobile photoacoustic sensor for on-line soot emission monitoring in diesel exhaust gas," Analytical and Bioanalytical Chemistry, Mar. 28, 2003, 375(8):1136-1143, 8 pages.

Bedoui et al., "Design and Electro-Thermal Analysis of a Platinum Micro Heater for Gas Sensors," 2016 13th International Multi-Conference on Systems, Signals & Devices (SSD), Mar. 2016, 4:558-561, 4 pages.

Bernasconi et al., "Advanced Pipeline Vibroacoustic Monitoring," Proceedings of the ASME 2013 Pressure Vessels and Piping Conference, PVP2013, Paris, France, Jul. 14-18, 2013, 7 pages.

Bhavani et al., "Diesel to Dual Fuel Conversion Process Development," International Journal of Engineering & Technology, Jul. 2018, 7(3):306-310, 5 pages.

Bieler et al., "Calibration of the step response of a 70 GHz sampling oscilloscope using a novel optoelectronic technique," 2008 Conference on Precision Electromagnetic Measurements Digest, Jun. 8-13, 2008, 678-679, 2 pages.

Bridges et al., "G-9-Small-Signal Step Response of Laser Amplifiers and Measurement of CO2 Laser Linewidth," IEEE Journal of Quantum Electronics, Nov. 1968, QE-4(11):777-782, 6 pages.

Brueckner et al., "Tunable diode laser absorption spectroscopy as method of choice for non-invasive and automated detection of microbial growth in media fills," Talanta, May 2017, 167:21-29, 9 pages.

Butler et al., "Prediction of Flash Points of Middle Distillates," Ind. Eng. Chem., Apr. 1956, 48(4):808-812, 5 pages.

Calaon et al., "Injection and injection-compression moulding replication capability for the production of polymer lab-on-a-chip with nano structures," Journal of Micromechanics and Microengineering, Sep. 12, 2017, 27(10), 13 pages.

Chan et al., "Size-Controlled Growth of CdSe Nanocrystals in Microfluidic Reactors," Nano Letters, Feb. 2003, 3(2):199-201, 3 pages.

Chen et al., "3D-printed microfluidic devices: fabrication, advantages and limitations—a mini review," Analytical Methods, Aug. 2016, 8(31):6005-6012, Aug. 21, 2016, 8 pages.

COC Topas Product Brochure, Section 4.2; Table 2, Mar. 2006, 20 pages.

Demirbas et al., "Diesel Fuel From Waste Lubricating Oil by Pyrolitic Distillation," Pet. Sci. Technol., 33(2): 129-138, Dec. 2015, 12 pages.

Fiorentin et al., "Effect of the finite memory length of a recorder in evaluating its frequency response of from step response," Instrumentation and Measurement Technology Conference, Anchorage, AK, USA, May 21-23, 2002, 1:787-791, 5 pages.

Foerster et al., "In situ monitoring of microfluidic distillation" Chemical Engineering Journal, 2013, 227:13-21, 9 pages.

(56) References Cited

OTHER PUBLICATIONS

Ghosh et al., "A mass manufacturable thermoplastic based microfluidic droplet generator on cyclic olefin copolymer," J. Micromechanics Microengineering, Apr. 10, 2019, 29(055009):1-9, 9 pages.
Giordano et al., "Distilling small volumes of crude oil," Fuel, Feb. 2021, 285(119072):1-8, 8 pages.
Gülüm et al., "Density, flash point and heating value variations of corn oil biodiesel-diesel fuel blends," Fuel Processing Technology, Jun. 2015, 134:456-464, 9 pages.
Hafeez et al., "Liquid fuel synthesis in microreactors," React. Chem. Eng., Aug. 2018, 3(4):414-432, 19 pages.
Hartman et al., "Distillation in microchemical systems using capillary forces and segmented flow," Lab on a Chip, First published as an Advance Article on the web Apr. 7, 2009, 9(13):1843-1849, 7 pages.
Hartman et al., "Multistep Microchemical Synthesis Enabled by Microfluidic Distillation," Angew. Chem. Int. Ed., Jan. 2010, 49(5): 899-903, 5 pages.
Hibara et al., "Microfluidic Distillation Utilizing Micro-Nano Combined Structure," Chem. Lett., Sep. 2008, 37(10): 1064-1065, 2 pages.
Hossain et al., "Designing of Hollow Core Grapefruit Fiber Using Cyclo Olefin Polymer for the Detection of Fuel Adulteration in Terahertz Region," Polymers, Dec. 29, 2022, 15(151):1-15, 15 pages.
Hua et al., "Determination of sulfur-containing compounds in diesel oils by comprehensive two-dimensional gas chromatography with a sulfur chemiluminescence detector," Journal of Chromatography A, Nov. 2003, 1019(1-2):101-109, 9 pages.
Jain et al., "Design and Simulation of Microfluidic Passive Mixer With Geometric Variation," Int. J. Res. Eng. Technol., Feb. 2016, 5(2):55-58, 4 pages.
Jena et al., "Cyclic olefin copolymer based microfluidic devices for biochip applications: Ultraviolet surface grafting using 2-methacryloyloxyethyl phosphorylcholine," Biomicrofluidics, Mar. 2012, 6(1):012822-1-012822-12, 12 pages.
Jena et al., "Micro fabrication of cyclic olefin copolymer (COC) based microfluidic devices," Microsystem Technologies, Oct. 18, 2011, 18(2):159-166, 8 pages.
Jiménez et al., "Chemiluminescence detection systems for the analysis of explosives," J. Hazard. Mater., Jan. 2004, 106(1): 1-8, 8 pages.
Jinno et al., "Identification of Polycyclic Aromatic Hydrocarbons in Extracts of Diesel Particulate Matter by Supercritical Fluid Chromatography Coupled with an Ultraviolet Multichannel Detector," Analytical Chemistry, 1986, 58(13): 2696-2699, 4 pages.
Kan et al., "Scale Prediction for Oil and Gas Production," SPE Journal, Jun. 2012, 17(2):362-378, 17 pages.
Karnati et al., "Design of Micro-heaters Inspired by Space Filling Fractal Curves," 2019 IEEE Region 10 Symposium (TENSYMP), Jun. 7-9, 2019, 231-236, 6 pages.
Kimmich et al., "Fault detection for modern Diesel engines using signal- and process model-based methods," Control Eng. Pract., Feb. 2005, 13(2):189-203, 15 pages.
Kothare et al., "Microreactors for efficient on-chip fuel processing and hydrogen generation," Nanofabrication: Technologies, Devices, and Applications, Jan. 2005, 5592(19):241-253, 13 pages.
Kraus et al., "An integrated multiphase flow sensor for microchannels," Experiments in Fluids, Jun. 2004, 36(6):819-832, 14 pages.
Lam et al., "Development of multistage distillation in a microfluidic chip," Lab on a Chip, Apr. 2011, 11(7):1311-1317, 7 pages.
Lam et al., "Towards an understanding of the effects of operating conditions on separation by microfluidic distillation," Chem. Eng. Sci., 66(10):2098-2106, May 2011, 9 pages.
Lamonte et al., "Cyclic Olefin Copolymers," Advanced Materials & Processes, Mar. 2001, 159(3):33-36, 4 pages.
Li et al., "Isoelectric focusing in cyclic olefin copolymer microfluidic channels coated by polyacrylamide using a UV photografting method," Electrophoresis, May 2005, 26(9):1800-1806, 7 pages.

Lin et al., "Integrated microfluidic reactors," Nano Today, Dec. 2009, 4(6):470-481, 12 pages.
Liu et al., "Micro-distillation system for formaldehyde concentration detection," Chem. Eng. J., Nov. 2016, 304:419-425, 7 pages.
Ljubas et al., "Influence of engine oils dilution by fuels on their viscosity, flash point and fire point," NAFTA, 2010, 61(2):73-79, 7 pages.
McGann et al., "Lean fuel detection with nanosecond-gated laser-induced breakdown spectroscopy," Combustion and Flame, Feb. 2021, 224:209-218, 10 pages.
McGuire et al., "Detection of the aromatic molecule benzonitrile (c-C6H5CN) in the interstellar medium," Science, Jan. 12, 2018, 359(6372):202-205, 4 pages.
Mehra et al., "A Six-Wafer Combustion System for a Silicon Micro Gas Turbine Engine," J. Microelectromechanical Syst., Dec. 2000, 9(4):517-527, 11 pages.
Mendonca et al., "Application of step response impedance spectroscopy for detection of skin irritation," Proceedings of the 25th Annual International Conference of the IEEE, Cancun, Mexico, Sep. 17-21, 2003, 4:3215-3217, 3 pages.
mitsuichemicals.com [online], "APEL," available on or before 2021, retrieved on Feb. 14, 2022, retrieved from URL <https://jp.mitsuichemicals.com/en/special/apel/about/properties/>, 7 pages.
Mulrooney et al., "Detection of carbon dioxide emissions from a diesel engine using a mid- infrared optical fibre based sensor," Sensors and Actuators A, May 2007, 136(1):104-110, 7 pages.
Nunes et al., "Cyclic olefin polymers: emerging materials for lab-on-a-chip Applications," Microfluid Nanofluid, Apr. 2010, 9:145-161, 17 pages.
Olajire, "A review of oilfield scale management technology for oil and gas production," Journal of Petroleum Science and Engineering, Nov. 2015, 135:723-737, 15 pages.
Petermann, "Chapter 4: Intensity-Modulation Characteristics of Laser Diodes," Laser diode modulation and Noise, Kluwer Academic, 1991, 78-118, 41 pages.
Rowland et al., "The Automated Assessment of Ultrasound Scanner Lateral and Slice Thickness Resolution: Use of the Step Response," Ultrasound in Medicine & Biology, Sep. 2009, 35(9):1525-1534, 10 pages.
Schuresko et al., "Carboxylation kinetics of hemoglobin and myoglobin: Linear Transient Response to Step Perturbation by Laser Photolysis," Biophysical Journal, Oct. 1978, 24(1): 382-383, 2 pages.
Seo et al., "Continuous Microfluidic Reactors for Polymer Particles," Langmuir, Dec. 2005, 21(25):11614-11622, 9 pages.
Shi-pe.shi.co.jp [online], "Course 4—Consider a mixing vessel as a huge viscometer," Available on or before Jun. 26, 2018, Internet Archive: Wayback Machine URL <https://web.archive.org/web/20240000000000/https://www.shi-pe.shi.co.jp/english/technology/mixing-lecture/004/index.html>, retrieved on Aug. 20, 2020, <https://www.shi-pe.shi.co.jp/english/technology/mixing-lecture/004/index.html>, 3 pages.
Soud, "Downstream oil theft: countermeasures and good practices," Atlantic Council, May 2020, retrieved from URL <https://www.atlanticcouncil.org/wp-content/uploads/2020/05/AC_OilTheft-Final-1.pdf>, 56 pages.
Spannhake et al., "High-temperature MEMS heater platforms: Long-term Performance of Metal and Semiconductor Heater Materials," Sensors, Apr. 7, 2006, 6(4):405-419, 15 pages.
Taghizadeh-Alisaraei et al., "Fault detection of injectors in diesel engines using vibration time-frequency analysis," Applied Acoustics, Jan. 1, 2019, 143:48-58, 11 pages.
thomassci.com [online], "Multi-Position Hot Plate Stirrer," 2022, retrieved on Feb. 15, 2022, retrieved from URL <https://www.thomassci.com/Equipment/Hot-Plates/_/Multi-Position-Hot-Plate-Stirrer?q=Multi%20Position%20Hotplate%20Stirrer>, 2 pages.
Udonne, "A comparative study of recycling of used lubrication Oils using distillation, acid and activated charcoal with clay methods," Journal of Petroleum and Gas Engineering, Feb. 2011, 2(2):12-19, 8 pages.
U.S. Appl. No. 18/128,903, Nour et al., Thin Polymer Film Dissolved Under Tension to Detect Hydrocarbon Fuels Hidden in Paraffin-Based Lubrication Oils, filed Mar. 30, 2023, 29 pages.

(56) References Cited

OTHER PUBLICATIONS

U.S. Appl. No. 18/135,533, Nour et al., Magnetic Film Fuel Detector, filed Apr. 17, 2023, 18 pages.
U.S. Appl. No. 18/135,535, Kharashi et al., Hydrocarbon Contaminant Detection Using Polymer Film, filed Apr. 17, 2023, 24 pages.
U.S. Appl. No. 18/135,539, Nour et al., Polymer Film Resistance Fuel Detector, filed Apr. 17, 2023, 19 pages.
U.S. Appl. No. 18/298,776, Nour et al., Detecting Hydrocarbon Fuels in Lubrication Oils, filed Apr. 11, 2023, 23 pages.
U.S. Appl. No. 18/301,581, Kharashi et al., Hydrocarbon Contaminant Detection Using Polymer Film, filed Apr. 17, 2023, 25 pages.
U.S. Appl. No. 18/301,610, Nour et al., Polymer Film Fuel Detector, filed Apr. 17, 2023, 19 pages.
Vahdati et al., "External Corrosion Detection of Oil Pipelines Using Fiber Optics," Sensors, Jan. 26, 2020, 20(684):1-16, 16 pages.
Van-Den-Begin et al., "Fast adsorption-desorption kinetics of hydrocarbons in silicalite-1 by the single-step frequency response method," Zeolites, Jul. 1989, 9(4): 287-292, 6 pages.
Wardzinska et al., "Step response sensitivity of VLSI Interconnects," 17th IEEE Workshop on Signal and Power Integrity (SPI), May 12-15, 2013, 4 pages.
Wronski et al., "The step response: a method to characterize mechanisms of renal blood flow autoregulation," American Journal of Physiology—Renal Physiology, First published Jul. 8, 2003, 285(4):F758-F764, 7 pages.
Yamagata et al., "Synthesis of highly fluorescent diketopyrrolopyrrole derivative and two-step response of fluorescence to acid," Tetrahedron Letters, Mar. 24, 2010, 51(12): 1596-1599, 4 pages.
Yang et al., "Determination of sulfur compounds in catalytic diesel oil by gas chromatography with atomic emission detector and its applications," Chinese Journal of Chromatography, Nov. 1, 2002, 20(6):493-497, Abstract Only, 2 pages.
Youn et al., "Fabrication of micro mold for hot-embossing of polyimide microfluidic platform by using electron beam lithography combined with inductively coupled plasma," Microelectron. Eng., 2008, 85(5-6):918-921, 4 pages.
Yu et al., "A novel polyimide based micro heater with high temperature uniformity," Sensors Actuators A: Physical, Feb. 2017, 257:58-64, 7 pages.
Zhang et al., "Spray model based on step response theory," Fuel, May 2012, 95(1): 499-503, 5 pages.
Zhang et al., "Design of the microfluidic chip of oil detection," Applied Mechanics and Materials, 117-119:517-520, Available online since Oct. 24, 2011, 5 pages.
Zhao et al., "Design principles and fabrication method for a miniaturized fuel gas combustion reactor," Sensors, The 3rd Conference on MicroFluidic Handling Systems, Oct. 4-6, 2017, 4 pages.

\* cited by examiner

CHANGES IN RESISTIVITY OF MESH-PATTERNED POLYMER THIN FILMS COATED WITH CONDUCTIVE TRACES USED TO DETECT HYDROCARBON FUELS HIDDEN IN PARAFFIN-BASED LUBRICATION OILS

TECHNICAL FIELD

The present disclosure applies to the detection of additives in oil.

BACKGROUND

Detecting the hydrocarbon fuels hidden by and mixed with lubrication oil is a challenge for the oil and gas industry. As an example, fuel markers are often a primary technology used for limiting smuggling practices. The markers can be achieved by mixing chemical additives with a target fuel. The markers can subsequently be detected using one of many analytical tools. However, fuel markers can be a costly solution, as the practice requires that the markers are added to the fuel at the pump in order to be detected in smuggled fuels. This translates to a waste of most of the markers that are mixed with fuels used legally. Moreover, additive marker amounts are directly related to the target detection concentration, thereby incentivizing the addition of higher concentrations of the additive to be able to detect smuggled fuels in trace quantities.

SUMMARY

The present disclosure describes techniques for using changes in resistivity of mesh-patterned polymer thin films coated with conductive traces to detect hydrocarbon fuels hidden in paraffin-based lubrication oils. In some implementations, a computer-implemented method includes the following. A thin Cyclic Olefin Copolymer (COC) film of a COC layer having a honey-comb mesh-pattern forming a conductive metal trace is sputtered. The thin COC film is configured to dissolve upon contact with alkyl aromatic compounds present in hydrocarbon fuels. A fluid sample of a hydrocarbon fuel is positioned in an open area on the thin COC film. A resistivity of the conductive metal trace is monitored in response to the positioning of the fluid sample. A determination is made in response to the monitoring that a change in a resistivity of the conductive metal trace has occurred resulting from a dissolution of the thin COC film. A time duration is measured from the positioning of the fluid sample to the change in the resistivity. A concentration of the hydrocarbon fuel in the fluid sample is determined based on the time duration.

The previously described implementation is implementable using a computer-implemented method; a non-transitory, computer-readable medium storing computer-readable instructions to perform the computer-implemented method; and a computer-implemented system including a computer memory interoperably coupled with a hardware processor configured to perform the computer-implemented method, the instructions stored on the non-transitory, computer-readable medium.

The subject matter described in this specification can be implemented in particular implementations, so as to realize one or more of the following advantages. A main advantage is lowering the cost of detecting smuggled diesel/gasoline by avoiding the use of marker additives to the entire fuel production to detect diesel. Also, microfluidic technology used in the present disclosure provides lower power consumption, uses smaller samples, and provides more rapid results.

The details of one or more implementations of the subject matter of this specification are set forth in the Detailed Description, the accompanying drawings, and the claims. Other features, aspects, and advantages of the subject matter will become apparent from the Detailed Description, the claims, and the accompanying drawings.

DESCRIPTION OF DRAWINGS

Like reference numbers and designations in the various drawings indicate like elements.

DETAILED DESCRIPTION

Figure 1:
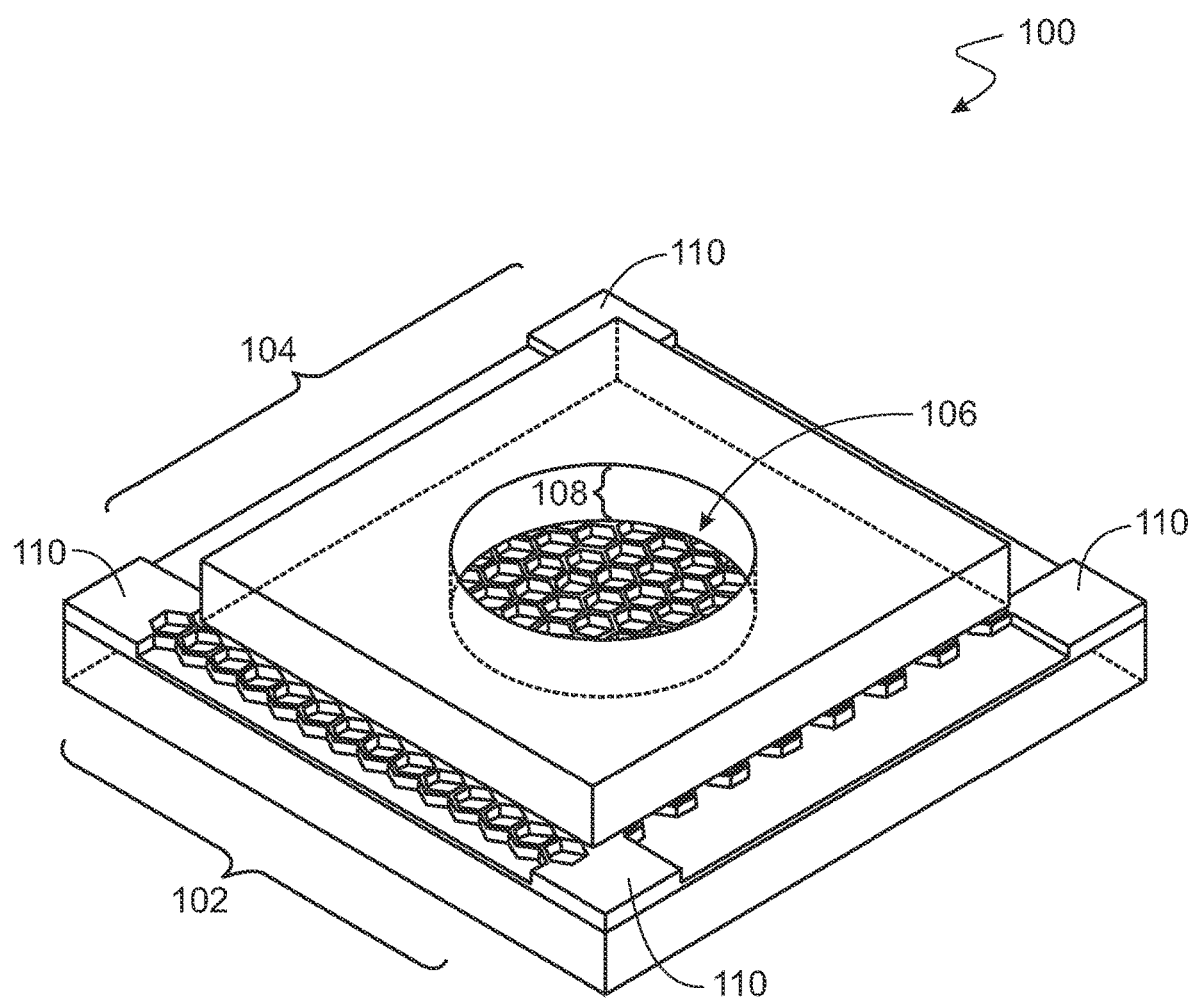
FIG. 1 is a diagram showing an example of a device including a comb mesh-pattern micro-thickness COC film coated with conductive traces for detecting hydrocarbon fuels, according to some implementations of the present disclosure.

The following detailed description describes techniques for using changes in resistivity of mesh-patterned polymer thin films coated with conductive traces to detect hydrocarbon fuels hidden in paraffin-based lubrication oils. Various modifications, alterations, and permutations of the disclosed implementations can be made and will be readily apparent to those of ordinary skill in the art, and the general principles defined may be applied to other implementations and applications, without departing from the scope of the disclosure. In some instances, details unnecessary to obtain an understanding of the described subject matter may be omitted so as to not obscure one or more described implementations with unnecessary detail and inasmuch as such details are within the skill of one of ordinary skill in the art. The present disclosure is not intended to be limited to the described or illustrated implementations, but to be accorded the widest scope consistent with the described principles and features.

The technology relates to using a honey-comb mesh-pattern micro-thickness Cyclic Olefin Copolymer (COC) film coated with conductive traces to detect hydrocarbon fuels. A thin sheet of COC is patterned with an ablative process. The COC mesh is sputtered with thin conductive traces. The conductive trace is configured to break upon the dissolution of the underlying COC mesh. For examination, a few milliliters volume of fluid sample is placed in the open area, and the conductivity/resistivity of the metal trace is monitored. In case the fluid sample contains aromatic chains, then it will dissolve the COC and change the resistivity of the material. Otherwise, the mesh resistivity will remain constant. The response and results show up immediately or within a few minutes.

The techniques of the present disclosure are designed to detect hydrocarbon fuel concentrations in paraffin-based lubrication oil mixtures to limit fuel smuggling practices without using chemical additives. The techniques are based on the use of a thin film of a COC layer that is mesh-patterned in an ablation process and coated with conductive traces. A sample of hydrocarbon fuels rich in alkyl aromatic compounds can be drop casted on the film. The dissolution of the COC film breaks the conductive trace, thereby changing the resistivity of the device. By monitoring the change of resistivity over time, the concentration and presence of hydrocarbon fuels can be discerned.

The techniques of the present disclosure are designed to detect hydrocarbon fuels in hidden lubrication oil mixtures to combat criminal exploitation and illegal acts using a thin film of COC coated with a conductive trace. COC dissolves in aromatic chain chemicals, such as benzene, which is present in hydrocarbon fuels. On the other hand, it is insoluble in paraffin solvents, such as high viscous lubrication oils. The techniques of the present disclosure can be used to detect the fuels by monitoring the dissolution time of the COC thin film. The resistivity of the conductive traces is changed as the underlying COC film dissolves, thereby breaking open some of the conductive lines. This can be used to monitor the film dissolution rate and correlated to the presence and concentration of the hydrocarbon fuels. The dissolving rate of the COC sheet depends on the COC thickness, the wall width of the COC, and the contact surface area of the COC with the aromatic fluid. Moreover, the aromatic concentration in the solution can influence the dissolving rate. COC thickness can vary in the range from 0.5 micrometers ($\mu m$) to 15 $\mu m$, and the wall thickness can be in the range from 5 $\mu m$ to 20 $\mu m$. The sensor was tested on a range of concentrations of adulterated fuels. The dissolution time can vary between one hour to 35 seconds, depending on the concentration.

A device can consist of a thin sheet of COC that is patterned with an ablative process. A COC mesh can be sputtered with thin conductive traces. The conductive trace breaks upon the dissolution of the underlying COC mesh. FIG. 1 shows an example of the device design. Several known methods of patterning COC films can be used, e.g., using a thermal embossing process, spin coat on molds, laser patterning, reactive ion etching (RIE), or by using other techniques. A high duty acrylic frame can be combined with the film to serve as a testing apparatus.

FIG. 1 is a diagram showing an example of a device 100 including a comb mesh-pattern micro-thickness COC film coated with conductive traces for detecting hydrocarbon fuels, according to some implementations of the present disclosure. The device 100 consists of a thin COC sheet 102 sputtered with a thin conductive trace, shown as honeycomb patterns in the device 100. The thin conductive trace comprising the honeycomb patterns breaks upon the dissolution of the thin COC sheet 102. The thin COC sheet 102 is accessible by an open area 106 of a raised section 104 having a height 108. Corners 110 provide the ends of the circuits connected by conductive elements of the honeycomb patterns.

The COC is acquired in a crystal form, and it is converted to a solution by dissolving it in toluene. Then, it is spin coated on a glass substrate. The rotating speed and the concentration of the COC in the solvents controls the thickness of the COC layer. Finally, the solvent is evaporated through a baking process which hardens the film. The film is coated with a thin conductive layer of metal via sputtering. A fiber laser is used to pattern the desired mesh pattern onto the device using laser ablation. The clamps can be fabricated using CO2 laser or mechanical processes and attached to the substrate using a mechanical clip, adhesive methods, or solvent.

For examination, a few milliliters volume of fluid sample is placed in the open area 106 and the conductivity/resistivity of the metal trace is monitored. In case the fluid sample contains aromatic chains, then it will dissolve the COC and change the resistivity of the material. Otherwise, the mesh resistivity will remain constant. The response and results show up immediately or within a few minutes.

The device 100 can include conductive pads that can be connected to an LED circuit for measuring changes in resistance. In some implementations, a potentiostat can be connected to also monitor the current and monitor changes in the resistance of the trace as the COC dissolves.

Figure 2:
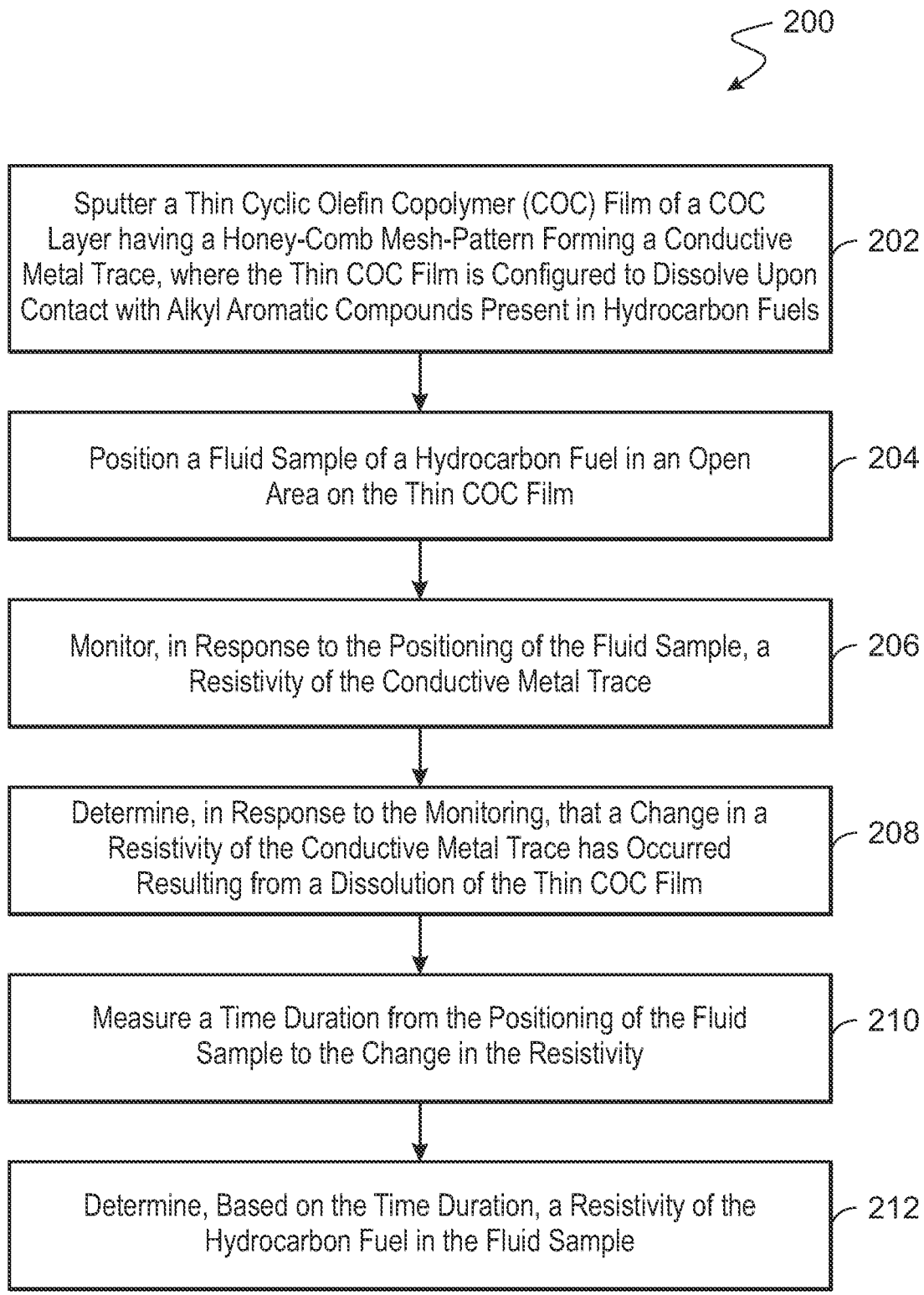
FIG. 2 is a flowchart showing an example of a method for determining the concentration of hydrocarbon fuel in a fluid sample, according to some implementations of the present disclosure.

FIG. 2 is a flowchart showing an example of a method 200 for determining the concentration of hydrocarbon fuel in a fluid sample, according to some implementations of the present disclosure. For clarity of presentation, the description that follows generally describes method 200 in the context of the other figures in this description. However, it will be understood that method 200 can be performed, for example, by any suitable system, environment, software, and hardware, or a combination of systems, environments, software, and hardware, as appropriate. In some implementations, various steps of method 200 can be run in parallel, in combination, in loops, or in any order.

At 202, a thin Cyclic Olefin Copolymer (COC) film of a COC layer having a honey-comb mesh-pattern forming a conductive metal trace is sputtered. The thin COC film is configured to dissolve upon contact with alkyl aromatic compounds present in hydrocarbon fuels. The sputtering process can include patterning using an ablative process, for example. From 202, method 200 proceeds to 204.

At 204, a fluid sample of a hydrocarbon fuel is positioned in an open area on the thin COC film. For example, the fluid sample can be decanted using a fixed-volume pipette. From 204, method 200 proceeds to 206.

At 206, a resistivity of the conductive metal trace is monitored in response to the positioning of the fluid sample. For example, video camera/mobile recording can be conducted using a fuse in a circuit for driving an LED. From 206, method 200 proceeds to 208.

At 208, a determination is made in response to the monitoring that a change in a resistivity of the conductive metal trace has occurred resulting from a dissolution of the thin COC film. Determining that a change in the resistivity of the conductive metal trace has occurred can include, for example, utilized a video feed to determine a time lapse between decanting the fluid and the LED going off. In some implementations, a potentiostat can be connected to also monitor the current and monitor changes in the resistance of the trace as the COC dissolves. From 208, method 200 proceeds to 210.

At 210, a time duration is measured from the positioning of the fluid sample to the change in the resistivity. Measuring the time duration can include, for example, the time lapse can be determined using the video feed. From 210, method 200 proceeds to 212.

At 212, a concentration of the hydrocarbon fuel in the fluid sample is determined based on the time duration. As an example, determining the concentration can include performing a table look-up of a concentration corresponding to the measured time duration. After 212, method 200 can stop.

In some implementations, in addition to (or in combination with) any previously-described features, techniques of the present disclosure can include the following. Outputs of the techniques of the present disclosure can be performed before, during, or in combination with wellbore operations, such as to provide inputs to change the settings or parameters of equipment used for drilling. Examples of wellbore operations include forming/drilling a wellbore, hydraulic fracturing, and producing through the wellbore, to name a few. The wellbore operations can be triggered or controlled, for example, by outputs of the methods of the present disclosure. In some implementations, customized user interfaces can present intermediate or final results of the above described processes to a user. Information can be presented in one or more textual, tabular, or graphical formats, such as through a dashboard. The information can be presented at one or more on-site locations (such as at an oil well or other facility), on the Internet (such as on a webpage), on a mobile application (or "app"), or at a central processing facility. The presented information can include suggestions, such as suggested changes in parameters or processing inputs, that the user can select to implement improvements in a production environment, such as in the exploration, production, and/or testing of petrochemical processes or facilities. For example, the suggestions can include parameters that, when selected by the user, can cause a change to, or an improvement in, drilling parameters (including drill bit speed and direction) or overall production of a gas or oil well. The suggestions, when implemented by the user, can improve the speed and accuracy of calculations, streamline processes, improve models, and solve problems related to efficiency, performance, safety, reliability, costs, downtime, and the need for human interaction. In some implementations, the suggestions can be implemented in real-time, such as to provide an immediate or near-immediate change in operations or in a model. The term real-time can correspond, for example, to events that occur within a specified period of time, such as within one minute or within one second. Events can include readings or measurements captured by downhole equipment such as sensors, pumps, bottom hole assemblies, or other equipment. The readings or measurements can be analyzed at the surface, such as by using applications that can include modeling applications and machine learning. The analysis can be used to generate changes to settings of downhole equipment, such as drilling equipment. In some implementations, values of parameters or other variables that are determined can be used automatically (such as through using rules) to implement changes in oil or gas well exploration, production/drilling, or testing. For example, outputs of the present disclosure can be used as inputs to other equipment and/or systems at a facility. This can be especially useful for systems or various pieces of equipment that are located several meters or several miles apart, or are located in different countries or other jurisdictions.

Figure 3:
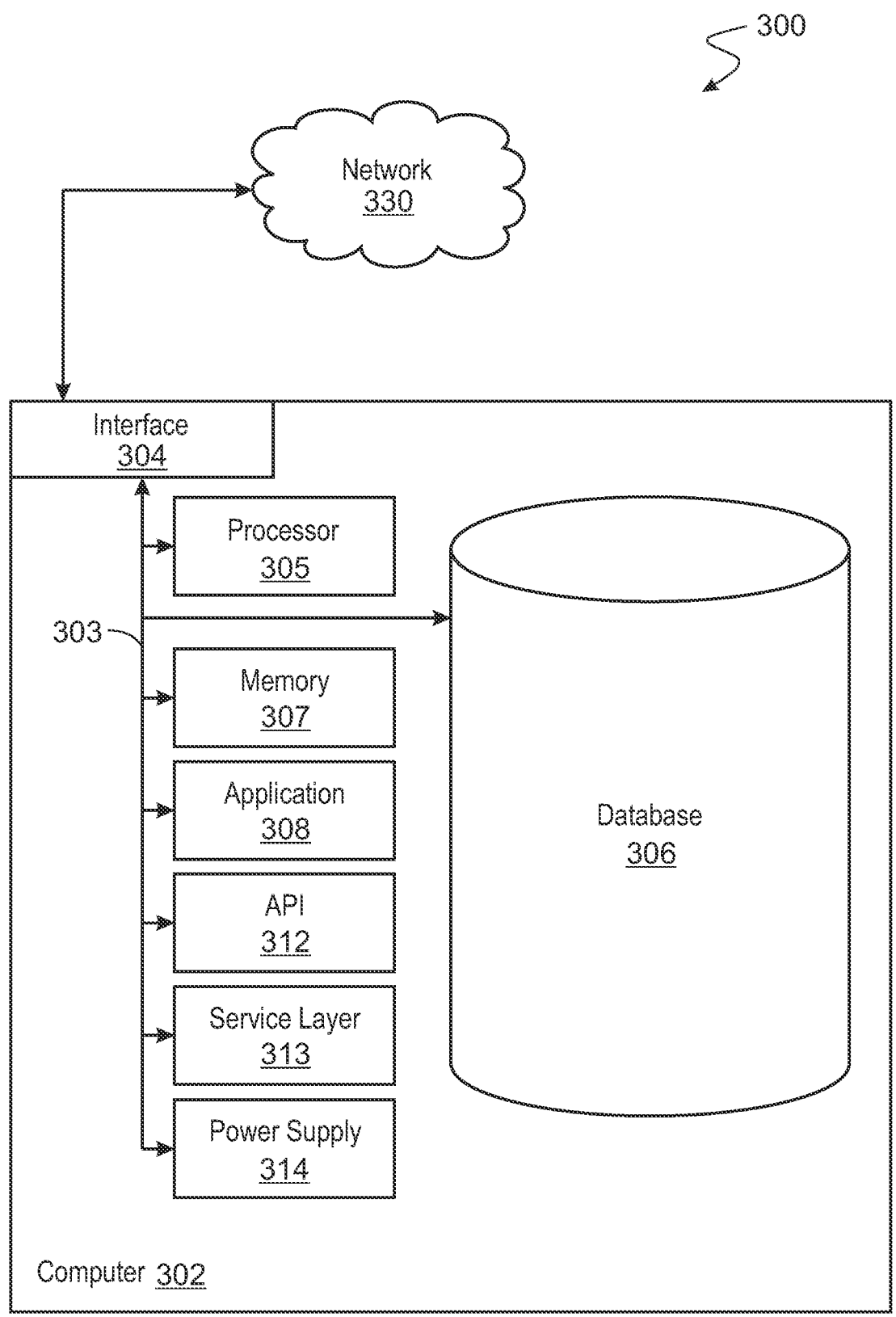
FIG. 3 is a block diagram illustrating an example computer system used to provide computational functionalities associated with described algorithms, methods, functions, processes, flows, and procedures as described in the present disclosure, according to some implementations of the present disclosure.

FIG. 3 is a block diagram of an example computer system 300 used to provide computational functionalities associated with described algorithms, methods, functions, processes, flows, and procedures described in the present disclosure, according to some implementations of the present disclosure. The illustrated computer 302 is intended to encompass any computing device such as a server, a desktop computer, a laptop/notebook computer, a wireless data port, a smart phone, a personal data assistant (PDA), a tablet computing device, or one or more processors within these devices, including physical instances, virtual instances, or both. The computer 302 can include input devices such as keypads, keyboards, and touch screens that can accept user information. Also, the computer 302 can include output devices that can convey information associated with the operation of the computer 302. The information can include digital data, visual data, audio information, or a combination of information. The information can be presented in a graphical user interface (UI) (or GUI).

The computer 302 can serve in a role as a client, a network component, a server, a database, a persistency, or components of a computer system for performing the subject matter described in the present disclosure. The illustrated computer 302 is communicably coupled with a network 330. In some implementations, one or more components of the computer 302 can be configured to operate within different environments, including cloud-computing-based environments, local environments, global environments, and combinations of environments.

At a top level, the computer 302 is an electronic computing device operable to receive, transmit, process, store, and manage data and information associated with the described subject matter. According to some implementations, the computer 302 can also include, or be communicably coupled with, an application server, an email server, a web server, a caching server, a streaming data server, or a combination of servers.

The computer 302 can receive requests over network 330 from a client application (for example, executing on another computer 302). The computer 302 can respond to the received requests by processing the received requests using software applications. Requests can also be sent to the computer 302 from internal users (for example, from a command console), external (or third) parties, automated applications, entities, individuals, systems, and computers.

Each of the components of the computer 302 can communicate using a system bus 303. In some implementations, any or all of the components of the computer 302, including hardware or software components, can interface with each other or the interface 304 (or a combination of both) over the system bus 303. Interfaces can use an application programming interface (API) 312, a service layer 313, or a combination of the API 312 and service layer 313. The API 312 can include specifications for routines, data structures, and object classes. The API 312 can be either computer-language independent or dependent. The API 312 can refer to a complete interface, a single function, or a set of APIs.

The service layer 313 can provide software services to the computer 302 and other components (whether illustrated or not) that are communicably coupled to the computer 302. The functionality of the computer 302 can be accessible for all service consumers using this service layer. Software services, such as those provided by the service layer 313, can provide reusable, defined functionalities through a defined interface. For example, the interface can be software written in JAVA, C++, or a language providing data in extensible markup language (XML) format. While illustrated as an integrated component of the computer 302, in alternative implementations, the API 312 or the service layer 313 can be stand-alone components in relation to other components of the computer 302 and other components communicably coupled to the computer 302. Moreover, any or all parts of the API 312 or the service layer 313 can be implemented as child or sub-modules of another software module, enterprise application, or hardware module without departing from the scope of the present disclosure.

The computer 302 includes an interface 304. Although illustrated as a single interface 304 in FIG. 3, two or more interfaces 304 can be used according to particular needs, desires, or particular implementations of the computer 302 and the described functionality. The interface 304 can be used by the computer 302 for communicating with other systems that are connected to the network 330 (whether illustrated or not) in a distributed environment. Generally, the interface 304 can include, or be implemented using, logic encoded in software or hardware (or a combination of software and hardware) operable to communicate with the network 330. More specifically, the interface 304 can include software supporting one or more communication protocols associated with communications. As such, the network 330 or the interface's hardware can be operable to communicate physical signals within and outside of the illustrated computer 302.

The computer 302 includes a processor 305. Although illustrated as a single processor 305 in FIG. 3, two or more processors 305 can be used according to particular needs, desires, or particular implementations of the computer 302 and the described functionality. Generally, the processor 305 can execute instructions and can manipulate data to perform the operations of the computer 302, including operations using algorithms, methods, functions, processes, flows, and procedures as described in the present disclosure.

The computer 302 also includes a database 306 that can hold data for the computer 302 and other components connected to the network 330 (whether illustrated or not). For example, database 306 can be an in-memory, conventional, or a database storing data consistent with the present disclosure. In some implementations, database 306 can be a combination of two or more different database types (for example, hybrid in-memory and conventional databases) according to particular needs, desires, or particular implementations of the computer 302 and the described functionality. Although illustrated as a single database 306 in FIG. 3, two or more databases (of the same, different, or combination of types) can be used according to particular needs, desires, or particular implementations of the computer 302 and the described functionality. While database 306 is illustrated as an internal component of the computer 302, in alternative implementations, database 306 can be external to the computer 302.

The computer 302 also includes a memory 307 that can hold data for the computer 302 or a combination of components connected to the network 330 (whether illustrated or not). Memory 307 can store any data consistent with the present disclosure. In some implementations, memory 307 can be a combination of two or more different types of memory (for example, a combination of semiconductor and magnetic storage) according to particular needs, desires, or particular implementations of the computer 302 and the described functionality. Although illustrated as a single memory 307 in FIG. 3, two or more memories 307 (of the same, different, or combination of types) can be used according to particular needs, desires, or particular implementations of the computer 302 and the described functionality. While memory 307 is illustrated as an internal component of the computer 302, in alternative implementations, memory 307 can be external to the computer 302.

The application 308 can be an algorithmic software engine providing functionality according to particular needs, desires, or particular implementations of the computer 302 and the described functionality. For example, application 308 can serve as one or more components, modules, or applications. Further, although illustrated as a single application 308, the application 308 can be implemented as multiple applications 308 on the computer 302. In addition, although illustrated as internal to the computer 302, in alternative implementations, the application 308 can be external to the computer 302.

The computer 302 can also include a power supply 314. The power supply 314 can include a rechargeable or non-rechargeable battery that can be configured to be either user- or non-user-replaceable. In some implementations, the power supply 314 can include power-conversion and management circuits, including recharging, standby, and power management functionalities. In some implementations, the power supply 314 can include a power plug to allow the computer 302 to be plugged into a wall socket or a power source to, for example, power the computer 302 or recharge a rechargeable battery.

There can be any number of computers 302 associated with, or external to, a computer system containing computer 302, with each computer 302 communicating over network 330. Further, the terms "client," "user," and other appropriate terminology can be used interchangeably, as appropriate, without departing from the scope of the present disclosure. Moreover, the present disclosure contemplates that many users can use one computer 302 and one user can use multiple computers 302.

Described implementations of the subject matter can include one or more features, alone or in combination.

For example, in a first implementation, a computer-implemented method includes the following. A thin Cyclic Olefin Copolymer (COC) film of a COC layer having a honey-comb mesh-pattern forming a conductive metal trace is sputtered. The thin COC film is configured to dissolve upon contact with alkyl aromatic compounds present in hydrocarbon fuels. A fluid sample of a hydrocarbon fuel is positioned in an open area on the thin COC film. A resistivity of the conductive metal trace is monitored in response to the positioning of the fluid sample. A determination is made in response to the monitoring that a change in a resistivity of the conductive metal trace has occurred resulting from a dissolution of the thin COC film. A time duration is measured from the positioning of the fluid sample to the change in the resistivity. A concentration of the hydrocarbon fuel in the fluid sample is determined based on the time duration.

The foregoing and other described implementations can each, optionally, include one or more of the following features:

A first feature, combinable with any of the following features, where the sputtering includes patterning using an ablative process.

A second feature, combinable with any of the previous or following features, where a thickness of the thin COC film is in a range of 0.5 micrometers ($\mu m$) to 15 $\mu m$.

A third feature, combinable with any of the previous or following features, where the thin COC film is positioned in a tight frame having a thickness in a range from 5 $\mu m$ to 20 $\mu m$.

A fourth feature, combinable with any of the previous or following features, where determining the concentration includes performing a table look-up of a concentration corresponding to the measured time duration.

A fifth feature, combinable with any of the previous or following features, where determining that a change in the resistivity of the conductive metal trace has occurred includes using conductive pads connected to an LED circuit configured to measure changes in resistance.

A sixth feature, combinable with any of the previous or following features, where determining that a change in the resistivity of the conductive metal trace has occurred includes using a potentiostat connected to the COC layer configured to monitor changes in the resistance of the trace during dissolves of the COC layer.

In a second implementation, a non-transitory, computer-readable medium stores one or more instructions executable by a computer system to perform operations including the following. A thin Cyclic Olefin Copolymer (COC) film of a COC layer having a honey-comb mesh-pattern forming a conductive metal trace is sputtered. The thin COC film is configured to dissolve upon contact with alkyl aromatic compounds present in hydrocarbon fuels. A fluid sample of a hydrocarbon fuel is positioned in an open area on the thin COC film. A resistivity of the conductive metal trace is monitored in response to the positioning of the fluid sample. A determination is made in response to the monitoring that a change in a resistivity of the conductive metal trace has occurred resulting from a dissolution of the thin COC film. A time duration is measured from the positioning of the fluid sample to the change in the resistivity. A concentration of the hydrocarbon fuel in the fluid sample is determined based on the time duration.

The foregoing and other described implementations can each, optionally, include one or more of the following features:

A first feature, combinable with any of the following features, where the sputtering includes patterning using an ablative process.

A second feature, combinable with any of the previous or following features, where a thickness of the thin COC film is in a range of 0.5 micrometers (µm) to 15 µm.

A third feature, combinable with any of the previous or following features, where the thin COC film is positioned in a tight frame having a thickness in a range from 5 µm to 20 µm.

A fourth feature, combinable with any of the previous or following features, where determining the concentration includes performing a table look-up of a concentration corresponding to the measured time duration.

A fifth feature, combinable with any of the previous or following features, where determining that a change in the resistivity of the conductive metal trace has occurred includes using conductive pads connected to an LED circuit configured to measure changes in resistance.

A sixth feature, combinable with any of the previous or following features, where determining that a change in the resistivity of the conductive metal trace has occurred includes using a potentiostat connected to the COC layer configured to monitor changes in the resistance of the trace during dissolves of the COC layer.

In a third implementation, a computer-implemented system includes one or more processors and a non-transitory computer-readable storage medium coupled to the one or more processors and storing programming instructions for execution by the one or more processors. The programming instructions instruct the one or more processors to perform operations including the following. A thin Cyclic Olefin Copolymer (COC) film of a COC layer having a honey-comb mesh-pattern forming a conductive metal trace is sputtered. The thin COC film is configured to dissolve upon contact with alkyl aromatic compounds present in hydrocarbon fuels. A fluid sample of a hydrocarbon fuel is positioned in an open area on the thin COC film. A resistivity of the conductive metal trace is monitored in response to the positioning of the fluid sample. A determination is made in response to the monitoring that a change in a resistivity of the conductive metal trace has occurred resulting from a dissolution of the thin COC film. A time duration is measured from the positioning of the fluid sample to the change in the resistivity. A concentration of the hydrocarbon fuel in the fluid sample is determined based on the time duration.

The foregoing and other described implementations can each, optionally, include one or more of the following features:

A first feature, combinable with any of the following features, where the sputtering includes patterning using an ablative process.

A second feature, combinable with any of the previous or following features, where a thickness of the thin COC film is in a range of 0.5 micrometers (µm) to 15 µm.

A third feature, combinable with any of the previous or following features, where the thin COC film is positioned in a tight frame having a thickness in a range from 5 µm to 20 µm.

A fourth feature, combinable with any of the previous or following features, where determining the concentration includes performing a table look-up of a concentration corresponding to the measured time duration.

A fifth feature, combinable with any of the previous or following features, where determining that a change in the resistivity of the conductive metal trace has occurred includes using conductive pads connected to an LED circuit configured to measure changes in resistance.

A sixth feature, combinable with any of the previous or following features, where determining that a change in the resistivity of the conductive metal trace has occurred includes using a potentiostat connected to the COC layer configured to monitor changes in the resistance of the trace during dissolves of the COC layer.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs. Each computer program can include one or more modules of computer program instructions encoded on a tangible, non-transitory, computer-readable computer-storage medium for execution by, or to control the operation of, data processing apparatus. Alternatively, or additionally, the program instructions can be encoded in/on an artificially generated propagated signal. For example, the signal can be a machine-generated electrical, optical, or electromagnetic signal that is generated to encode information for transmission to a suitable receiver apparatus for execution by a data processing apparatus. The computer-storage medium can be a machine-readable storage device, a machine-readable storage substrate, a random or serial access memory device, or a combination of computer-storage mediums.

The terms "data processing apparatus," "computer," and "electronic computer device" (or equivalent as understood by one of ordinary skill in the art) refer to data processing hardware. For example, a data processing apparatus can encompass all kinds of apparatuses, devices, and machines for processing data, including by way of example, a programmable processor, a computer, or multiple processors or computers. The apparatus can also include special purpose logic circuitry including, for example, a central processing unit (CPU), a field-programmable gate array (FPGA), or an application-specific integrated circuit (ASIC). In some implementations, the data processing apparatus or special purpose logic circuitry (or a combination of the data processing apparatus or special purpose logic circuitry) can be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with or without conventional operating systems, such as LINUX, UNIX, WINDOWS, MAC OS, ANDROID, or IOS.

A computer program, which can also be referred to or described as a program, software, a software application, a module, a software module, a script, or code, can be written in any form of programming language. Programming languages can include, for example, compiled languages, interpreted languages, declarative languages, or procedural languages. Programs can be deployed in any form, including as stand-alone programs, modules, components, subroutines, or units for use in a computing environment. A computer program can, but need not, correspond to a file in a file system. A program can be stored in a portion of a file that holds other programs or data, for example, one or more scripts stored in a markup language document, in a single file dedicated to the program in question, or in multiple coordinated files storing one or more modules, sub-programs, or portions of code. A computer program can be deployed for execution on one computer or on multiple computers that are located, for example, at one site or distributed across multiple sites that are interconnected by a communication network. While portions of the programs illustrated in the various figures may be shown as individual modules that implement the various features and functionality through various objects, methods, or processes, the programs can instead include a number of sub-modules, third-party services, components, and libraries. Conversely, the features and functionality of various components can be combined into single components as appropriate. Thresholds used to make computational determinations can be statically, dynamically, or both statically and dynamically determined.

The methods, processes, or logic flows described in this specification can be performed by one or more programmable computers executing one or more computer programs to perform functions by operating on input data and generating output. The methods, processes, or logic flows can also be performed by, and apparatus can also be implemented as, special purpose logic circuitry, for example, a CPU, an FPGA, or an ASIC.

Computers suitable for the execution of a computer program can be based on one or more of general and special purpose microprocessors and other kinds of CPUs. The elements of a computer are a CPU for performing or executing instructions and one or more memory devices for storing instructions and data. Generally, a CPU can receive instructions and data from (and write data to) a memory.

Graphics processing units (GPUs) can also be used in combination with CPUs. The GPUs can provide specialized processing that occurs in parallel to processing performed by CPUs. The specialized processing can include artificial intelligence (AI) applications and processing, for example. GPUs can be used in GPU clusters or in multi-GPU computing.

A computer can include, or be operatively coupled to, one or more mass storage devices for storing data. In some implementations, a computer can receive data from, and transfer data to, the mass storage devices including, for example, magnetic, magneto-optical disks, or optical disks. Moreover, a computer can be embedded in another device, for example, a mobile telephone, a personal digital assistant (PDA), a mobile audio or video player, a game console, a global positioning system (GPS) receiver, or a portable storage device such as a universal serial bus (USB) flash drive.

Computer-readable media (transitory or non-transitory, as appropriate) suitable for storing computer program instructions and data can include all forms of permanent/non-permanent and volatile/non-volatile memory, media, and memory devices. Computer-readable media can include, for example, semiconductor memory devices such as random access memory (RAM), read-only memory (ROM), phase change memory (PRAM), static random access memory (SRAM), dynamic random access memory (DRAM), erasable programmable read-only memory (EPROM), electrically erasable programmable read-only memory (EEPROM), and flash memory devices. Computer-readable media can also include, for example, magnetic devices such as tape, cartridges, cassettes, and internal/removable disks. Computer-readable media can also include magneto-optical disks and optical memory devices and technologies including, for example, digital video disc (DVD), CD-ROM, DVD+/-R, DVD-RAM, DVD-ROM, HD-DVD, and BLU-RAY. The memory can store various objects or data, including caches, classes, frameworks, applications, modules, backup data, jobs, web pages, web page templates, data structures, database tables, repositories, and dynamic information. Types of objects and data stored in memory can include parameters, variables, algorithms, instructions, rules, constraints, and references. Additionally, the memory can include logs, policies, security or access data, and reporting files. The processor and the memory can be supplemented by, or incorporated into, special purpose logic circuitry.

Implementations of the subject matter described in the present disclosure can be implemented on a computer having a display device for providing interaction with a user, including displaying information to (and receiving input from) the user. Types of display devices can include, for example, a cathode ray tube (CRT), a liquid crystal display (LCD), a light-emitting diode (LED), and a plasma monitor. Display devices can include a keyboard and pointing devices including, for example, a mouse, a trackball, or a trackpad. User input can also be provided to the computer through the use of a touchscreen, such as a tablet computer surface with pressure sensitivity or a multi-touch screen using capacitive or electric sensing. Other kinds of devices can be used to provide for interaction with a user, including to receive user feedback including, for example, sensory feedback including visual feedback, auditory feedback, or tactile feedback. Input from the user can be received in the form of acoustic, speech, or tactile input. In addition, a computer can interact with a user by sending documents to, and receiving documents from, a device that the user uses. For example, the computer can send web pages to a web browser on a user's client device in response to requests received from the web browser.

The term "graphical user interface," or "GUI," can be used in the singular or the plural to describe one or more graphical user interfaces and each of the displays of a particular graphical user interface. Therefore, a GUI can represent any graphical user interface, including, but not limited to, a web browser, a touch-screen, or a command line interface (CLI) that processes information and efficiently presents the information results to the user. In general, a GUI can include a plurality of user interface (UI) elements, some or all associated with a web browser, such as interactive fields, pull-down lists, and buttons. These and other UI elements can be related to or represent the functions of the web browser.

Implementations of the subject matter described in this specification can be implemented in a computing system that includes a back-end component, for example, as a data server, or that includes a middleware component, for example, an application server. Moreover, the computing system can include a front-end component, for example, a client computer having one or both of a graphical user interface or a Web browser through which a user can interact with the computer. The components of the system can be interconnected by any form or medium of wireline or wireless digital data communication (or a combination of data communication) in a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) (for example, using 802.11 a/b/g/n or 802.20 or a combination of protocols), all or a portion of the Internet, or any other communication system or systems at one or more locations (or a combination of communication networks). The network can communicate with, for example, Internet Protocol (IP) packets, frame relay frames, asynchronous transfer mode (ATM) cells, voice, video, data, or a combination of communication types between network addresses.

The computing system can include clients and servers. A client and server can generally be remote from each other and can typically interact through a communication network. The relationship of client and server can arise by virtue of computer programs running on the respective computers and having a client-server relationship.

Cluster file systems can be any file system type accessible from multiple servers for read and update. Locking or consistency tracking may not be necessary since the locking of exchange file system can be done at the application layer. Furthermore, Unicode data files can be different from non-Unicode data files.

While this specification contains many specific implementation details, these should not be construed as limitations on the scope of what may be claimed, but rather as descriptions of features that may be specific to particular implementations. Certain features that are described in this specification in the context of separate implementations can also be implemented, in combination, in a single implementation. Conversely, various features that are described in the context of a single implementation can also be implemented in multiple implementations, separately, or in any suitable sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the previously described implementations should not be understood as requiring such separation or integration in all implementations. It should be understood that the described program components and systems can generally be integrated together in a single software product or packaged into multiple software products.

Accordingly, the previously described example implementations do not define or constrain the present disclosure. Other changes, substitutions, and alterations are also possible without departing from the spirit and scope of the present disclosure.

Furthermore, any claimed implementation is considered to be applicable to at least a computer-implemented method; a non-transitory, computer-readable medium storing computer-readable instructions to perform the computer-implemented method; and a computer system including a computer memory interoperably coupled with a hardware processor configured to perform the computer-implemented method or the instructions stored on the non-transitory, computer-readable medium.

What is claimed is:

1. A computer-implemented method, comprising:
    sputtering a thin Cyclic Olefin Copolymer (COC) film of a COC layer having a honey-comb mesh-pattern forming a conductive metal trace, wherein the thin COC film is configured to dissolve upon contact with alkyl aromatic compounds present in hydrocarbon fuels;
    positioning a fluid sample of a hydrocarbon fuel in an open area on the thin COC film;
    monitoring, in response to the positioning of the fluid sample, a resistivity of the conductive metal trace;
    determining, in response to the monitoring, that a change in a resistivity of the conductive metal trace has occurred resulting from a dissolution of the thin COC film;
    measuring a time duration from the positioning of the fluid sample to the change in the resistivity; and
    determining, based on the time duration, a concentration of the hydrocarbon fuel in the fluid sample.

2. The computer-implemented method of claim 1, wherein the sputtering includes patterning using an ablative process.

3. The computer-implemented method of claim 1, wherein a thickness of the thin COC film is in a range of 0.5 micrometers (μm) to 15 μm.

4. The computer-implemented method of claim 1, wherein the thin COC film is positioned in a tight frame having a thickness in a range from 5 μm to 20 μm.

5. The computer-implemented method of claim 1, wherein determining the concentration includes performing a table look-up of a concentration corresponding to the measured time duration.

6. The computer-implemented method of claim 1, wherein determining that a change in the resistivity of the conductive metal trace has occurred includes using conductive pads connected to an LED circuit configured to measure changes in resistance.

7. The computer-implemented method of claim 1, wherein determining that a change in the resistivity of the conductive metal trace has occurred includes using a potentiostat connected to the COC layer configured to monitor changes in the resistance of the trace during dissolves of the COC layer.

8. A non-transitory, computer-readable medium storing one or more instructions executable by a computer system to perform operations comprising:
- sputtering a thin Cyclic Olefin Copolymer (COC) film of a COC layer having a honey-comb mesh-pattern forming a conductive metal trace, wherein the thin COC film is configured to dissolve upon contact with alkyl aromatic compounds present in hydrocarbon fuels;
- positioning a fluid sample of a hydrocarbon fuel in an open area on the thin COC film;
- monitoring, in response to the positioning of the fluid sample, a resistivity of the conductive metal trace;
- determining, in response to the monitoring, that a change in a resistivity of the conductive metal trace has occurred resulting from a dissolution of the thin COC film;
- measuring a time duration from the positioning of the fluid sample to the change in the resistivity; and
- determining, based on the time duration, a concentration of the hydrocarbon fuel in the fluid sample.

9. The non-transitory, computer-readable medium of claim 8, wherein the sputtering includes patterning using an ablative process.

10. The non-transitory, computer-readable medium of claim 8, wherein a thickness of the thin COC film is in a range of 0.5 micrometers ($\mu$m) to 15 $\mu$m.

11. The non-transitory, computer-readable medium of claim 8, wherein the thin COC film is positioned in a tight frame having a thickness in a range from 5 $\mu$m to 20 $\mu$m.

12. The non-transitory, computer-readable medium of claim 8, wherein determining the concentration includes performing a table look-up of a concentration corresponding to the measured time duration.

13. The non-transitory, computer-readable medium of claim 8, wherein determining that a change in the resistivity of the conductive metal trace has occurred includes using conductive pads connected to an LED circuit configured to measure changes in resistance.

14. The non-transitory, computer-readable medium of claim 8, wherein determining that a change in the resistivity of the conductive metal trace has occurred includes using a potentiostat connected to the COC layer configured to monitor changes in the resistance of the trace during dissolves of the COC layer.

15. A computer-implemented system, comprising:
one or more processors; and
a non-transitory computer-readable storage medium coupled to the one or more processors and storing programming instructions for execution by the one or more processors, the programming instructions instructing the one or more processors to perform operations comprising:
- sputtering a thin Cyclic Olefin Copolymer (COC) film of a COC layer having a honey-comb mesh-pattern forming a conductive metal trace, wherein the thin COC film is configured to dissolve upon contact with alkyl aromatic compounds present in hydrocarbon fuels;
- positioning a fluid sample of a hydrocarbon fuel in an open area on the thin COC film;
- monitoring, in response to the positioning of the fluid sample, a resistivity of the conductive metal trace;
- determining, in response to the monitoring, that a change in a resistivity of the conductive metal trace has occurred resulting from a dissolution of the thin COC film;
- measuring a time duration from the positioning of the fluid sample to the change in the resistivity; and
- determining, based on the time duration, a concentration of the hydrocarbon fuel in the fluid sample.

16. The computer-implemented system of claim 15, wherein the sputtering includes patterning using an ablative process.

17. The computer-implemented system of claim 15, wherein a thickness of the thin COC film is in a range of 0.5 micrometers ($\mu$m) to 15 $\mu$m.

18. The computer-implemented system of claim 15, wherein the thin COC film is positioned in a tight frame having a thickness in a range from 5 $\mu$m to 20 $\mu$m.

19. The computer-implemented system of claim 15, wherein determining the concentration includes performing a table look-up of a concentration corresponding to the measured time duration.

20. The computer-implemented system of claim 15, wherein determining that a change in the resistivity of the conductive metal trace has occurred includes using conductive pads connected to an LED circuit configured to measure changes in resistance.

* * * * *